US009823949B2

(12) United States Patent
Ristock et al.

(10) Patent No.: US 9,823,949 B2
(45) Date of Patent: Nov. 21, 2017

(54) SYSTEM AND METHOD FOR INTELLIGENT TASK MANAGEMENT AND ROUTING

(71) Applicant: Genesys Telecommunications Laboratories, Inc., Daly City, CA (US)

(72) Inventors: Herbert Willi Artur Ristock, Walnut Creek, CA (US); Vidas Placiakis, Walnut Creek, CA (US); Vitaliy Teryoshin, Danville, CA (US); Nikolay I. Korolev, Concord, CA (US); Yevgeniy Petrovykh, Walnut Creek, CA (US); Anand Pai Krishnanand Nitin, Foster City, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 74 days.

(21) Appl. No.: 14/754,530

(22) Filed: Jun. 29, 2015

(65) Prior Publication Data
US 2016/0378569 A1 Dec. 29, 2016

(51) Int. Cl.
*G06F 9/50* (2006.01)
*G06Q 10/00* (2012.01)

(52) U.S. Cl.
CPC .......... *G06F 9/5083* (2013.01); *G06Q 10/00* (2013.01)

(58) Field of Classification Search
None
See application file for complete search history.

(56) References Cited

U.S. PATENT DOCUMENTS

| | | |
|---|---|---|
| 6,381,640 B1 | 4/2002 | Beck et al. |
| 7,308,093 B2 | 12/2007 | Annadata et al. |
| 2004/0163085 A1 | 8/2004 | Dillenberger et al. |
| 2007/0185925 A1* | 8/2007 | Prahlad ............ G06F 17/30528 |
| 2007/0192402 A1 | 8/2007 | Dean et al. |
| 2008/0120592 A1 | 5/2008 | Tanguay et al. |
| 2012/0191716 A1 | 7/2012 | Omoigui |

(Continued)

OTHER PUBLICATIONS

International Search Report and Written Opinion for International Application No. PCT/US2016/039887, dated Oct. 4, 2016, 23 pages.

*Primary Examiner* — Kenneth Tang
(74) *Attorney, Agent, or Firm* — Lewis Roca Rothgerber Christie LLP

(57) ABSTRACT

Systems and methods are shown for routing task objects to multiple agents that involve analyzing content of each task object in an input buffer to determine a classification relevant to the content of the task object that is added to task object metadata, which is placed in a second buffer. Objects in the second buffer are analyzed and the classification in the object metadata used to search workforce management data representing agent characteristics to identify agents who match the classification. A routing strategy is applied to the object to select an agent and the object is routed to the agent's workbin. Another aspect involves organizing workbin tasks objects by priority, according to recent system conditions excluding objects that cannot presently be processed based on a workflow strategy or status data and presenting remaining objects based on order of priority, or re-arranging objects between workbins based on recent status info.

19 Claims, 12 Drawing Sheets

(56) References Cited

U.S. PATENT DOCUMENTS

| | | |
|---|---|---|
| 2012/0300921 A1 | 11/2012 | Jennings |
| 2014/0122188 A1 | 5/2014 | Van Pelt et al. |
| 2014/0140495 A1 | 5/2014 | Ristock et al. |
| 2014/0140498 A1 | 5/2014 | Mezhibovsky et al. |
| 2016/0381222 A1 | 12/2016 | Ristock et al. |

* cited by examiner

SYSTEM AND METHOD FOR INTELLIGENT TASK MANAGEMENT AND ROUTING

CROSS-REFERENCE TO RELATED APPLICATIONS

This application is related to commonly owned U.S. patent application Ser. No. 14/754,484, filed on Jun. 29, 2015, which is incorporated by reference in its entirety for all purposes.

BACKGROUND

Systems and methods, such as contact centers, provide for a way for large numbers of tasks, such as interactions, to be assigned to multiple agents for completion. It is generally beneficial for these systems and methods to automate the routing and management of these tasks, intelligently utilize the capabilities of the agents, make efficient use of services and resources, and provide consistent approaches to handling various types of tasks.

SUMMARY

According to one aspect of the present invention, an example of a system for routing tasks to multiple agents, where the system may be composed of one or more servers configured to receive tasks and, for each task, create a task object representing the task and its content, and place the task object in an input buffer. The system analyzes the content of each task object in the input buffer, determines at least one pre-defined classification that is relevant to the content of the task object, which is added to metadata of the task object, and places the task object in a second buffer. The system analyzes the content of task objects in the second buffer, uses the pre-defined classification in the metadata to search workforce management data representing agent characteristics, and identifies one or more agents for assignment of the task object based on at least a partial match of the classification with the agents' workforce management data. The system applies a pre-defined routing strategy to the task object in the second buffer to further identify one of the identified agents for assignment of the task object and routes the task object to the identified agent's workbin.

In an example of a further refinement, unprocessed task objects are moved back to either the input buffer or second buffer for re-assignment on a periodic, parametric or event basis or some combination of these bases. In one example, the event basis is a status change of an agent from unavailable to available. In another example, the parametric basis involves an analysis of workload levels in the agents' workbins. In still another example, the periodic basis is a pre-determined time interval. In an example of another refinement, the operation of analyzing the content of a task object in the second buffer involves utilizing statistical data relating to agent performance to identify at least one agent capable to process the task within a pre-defined performance criterion. In still another example of a refinement, the operation of analyzing the content of a task object in the second buffer involves utilizing workforce data to forecast availability or unavailability of an agent to process the task within a pre-determined performance criterion. In still yet another example of a refinement, the one or more servers are further configured to perform the following operations: utilizing statistical data relating to agent performance, analyze task objects in an agent workbin to forecast that an agent will be unlikely to process a task within a pre-defined performance criterion and move the task object for the identified task from the agent's workbin to either the input buffer or second buffer for re-assignment. In another example of a refinement, the servers are configured to analyze the content of a task object in the input buffer by determining whether an agent has previously interacted with a source of the task object and adding metadata identifying the agent.

In still another refinement example, the servers are further configured to perform the following operations: utilizing statistical data relating to agent performance, analyze task objects in an agent workbin to forecast that an agent will be unlikely to process a task within a pre-defined performance criterion and move the task object for the identified task from the agent's workbin to the second buffer for re-assignment. In another refinement, the servers are further configured to perform the following operations: utilizing statistical data relating to agent performance, analyze task objects in a first agent workbin to forecast that a first agent will be unlikely to process a task within a pre-defined performance criterion, apply the routing strategy to the task object in the first agent workbin to further identify a second agent for reassignment of the task object, and move the task object for the task from the first agent's workbin to the second agent's workbin.

In another example, the servers are further configured to utilize statistical data relating to agent performance to analyze task objects in an agent workbin to forecast that an agent will be unlikely to process a task within a pre-defined performance criterion and move the task object for the identified task from the agent's workbin to the second buffer for re-assignment. In still another example, the servers are further configured to utilize statistical data relating to agent performance to analyze task objects in a first agent workbin to forecast that a first agent will be unlikely to process a task within a pre-defined performance criterion, apply the routing strategy to the task object in the first agent workbin to further identify a second agent for reassignment of the task object, and move the task object for the task from the first agent's workbin to the second agent's workbin. In yet another example, the servers are further configured to utilize statistical data relating to agent performance to forecast that an agent will be unlikely to process a task within a pre-defined performance criterion by utilizing statistical data relating to agent performance to determine an amount of time required to process tasks previously assigned to the agent.

In another refinement of the example system, the operation of analyzing the content of a task object in the input buffer involves applying a predefined model to the task object and automatically adding an additional destination to the task object based on the content of the task object. In a different refinement, the operation of analyzing the content of a task object in the input buffer includes analyzing the content of the task object in the input buffer and adding a keyword to the metadata of the task object, where the keyword is relevant to the content of the task object.

Related methods and persistent computer readable media are also described herein.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying an particular order or arrangement among or between various steps or elements except when the order of individual steps or arrangement of elements is explicitly described.

Further, though the detailed description below generally references a contact center for processing interactions, certain aspects of the present approach may be applied to a variety of contexts involving the routing and management of a large number of tasks to multiple agents or persons. For example, certain aspects of the present examples may be applied to managing and assigning the tasks involved in code development, building or manufacturing projects, as well as the processing of orders, documents or shipping. Other aspects of these examples may be applicable to corporate email systems. These contexts are generally characterized by large-scale, complex operations involving a large number of tasks that are to be performed by a large group of agents or persons. The following examples may provide for improved routing and management of tasks in such contexts.

Figure 1:
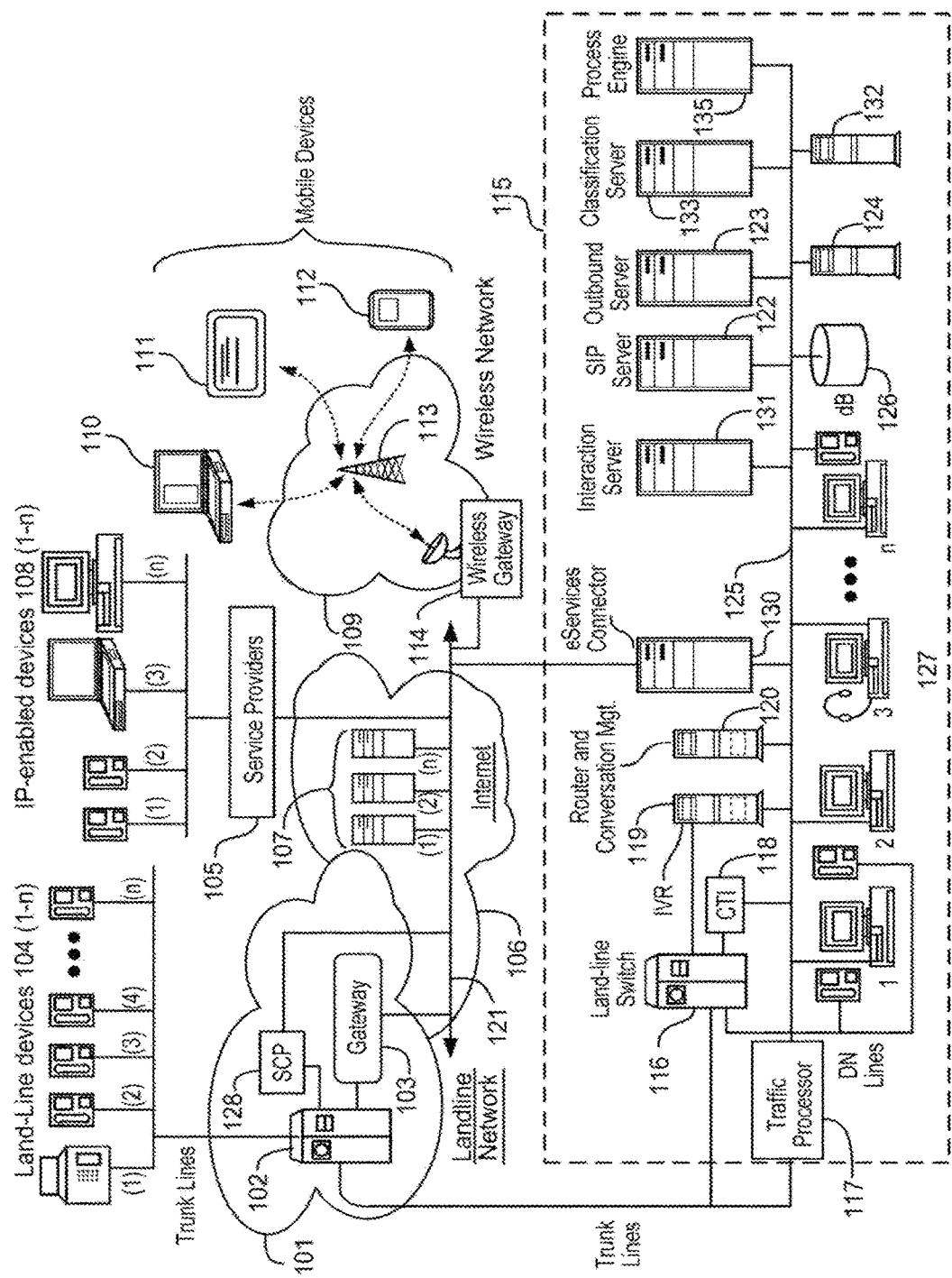
FIG. 1 is a schematic diagram depicting an example of a contact center system.

FIG. 1 is a block diagram illustrating a contact center 115 and a plurality of networks with interconnections where customers may interact with agents at the contact center. Contact center 115 may be hosted by an enterprise and the enterprise may employ more than one contact center. Customers and agents may interact with contact center 115 through communication appliances such as land-line devices, e.g., telephones and facsimile machines 104 (1-$n$), IP-enabled devices 108 (1-$n$), e.g., laptop or desktop computer and IP-enabled phones, through mobile devices 110, 111 or 112, e.g., mobile phones, smart phones, personal digital assistants, tablets, etc. Interactions may include voice, text interaction, email, messaging services chat, facsimiles, mailed letters, and so on.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either as land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch. In some implementations, a server may be provided to handle rich media interactions, such as those based on Flash, or social media interfaces.

Interactions through IP-enabled devices 108 (1-$n$) may occur through the Internet network via backbone 121, enabled by a variety of service providers 105 which operate to provide Internet service for such devices. Devices 102(1) and 102(2) may be IP-enabled telephones, operating wider a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108($n$) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by as land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

CONTACT CENTER

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMUNATON SYSTEMS, INC. T-server. Calls may be buffered in any one of a variety of ways before connection to an agent, either locally-based or remote from the contact center, depending on circumstances.

Incoming land-line calls to switch 116 may also be connected to the IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMINATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more. In some implementations, a co-browse server may be provided to manage co-browse sessions.

The Interaction Server 131 may leverage services of other servers in the contact center, and available remotely as well. For example, a Universal Contact Server 132 may store data on contacts, e.g., customers, including customer profiles, preferences and interaction history, history of customer touchpoints and standard responses, and interaction or task records as well as a knowledge base of suggested responses to contacts. The customer profile can include information about a level of service that the customer's interactions are to receive, e.g., for distinguishing a customer segment (gold/silver/bronze) a particular interaction belongs to. Some implementations may include a knowledge center that manages knowledge articles and Frequently Asked Questions or a conversation manager that manages customer journeys to identify customer segmentation, state of the journey and overall sentiment.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other communication process.

A statistics server 124 is illustrated in contact center 115, connected to LAN 125, and may provide a variety of services to agents operating in the contact center, and in some circumstances to customers of the contact center.

Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be buffered to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary. For example, an architecture for the contact center 115 may enable an agent to request assignment of all current active tasks within the system that are related to a particular customer, such as after an agent has started processing a task for the customer.

Contact centers 115 may operate with a wide variety of media channels for interaction with customers who call in to the centers. Such channels may enable voice interaction in some instances, and in other instances text-based interaction, which may include chat sessions, email exchanges, and text messaging, etc. Some examples of a contact center 115 may also operate to internally generate tasks, such as initiating a contact with a customer for contract renewal, review a contract proposal, or attend training. For example, a conversation manager may track a contract renewal journey and the various tasks associated with this process The contact center 115 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Classification Server 133 applies screen rules and models to interactions. In some examples, Classification Server 133 applies screening rules when triggered to do so by a routing strategy active in Routing Server 120. Examples of Classification Server 133 may also apply models to categorize incoming interactions, where it creates and refines its recognition algorithms through training. Screening rules and models may be stored in the database of Contact Server 132. Classification Server 133 may be configured or coupled to a training server configured to produce classification models that recognize categories of interactions. For example, a model may be produced by creating a training object and then scheduling and running a training session, which trains the model based on setting configured for the system through, for example, a knowledge manager server. An example of a knowledge manager includes an administrative user interface for defining and managing standard responses, screening rules and models as well as configuring and scheduling classification training session and managing classification models. In operation, one example of Classification Server 133 may scan incoming e-mails, assigning the e-mail to one or more categories with a percentage confidence rating, and then use the category assignments to pull suggested responses from a standard response library.

Figure 2:
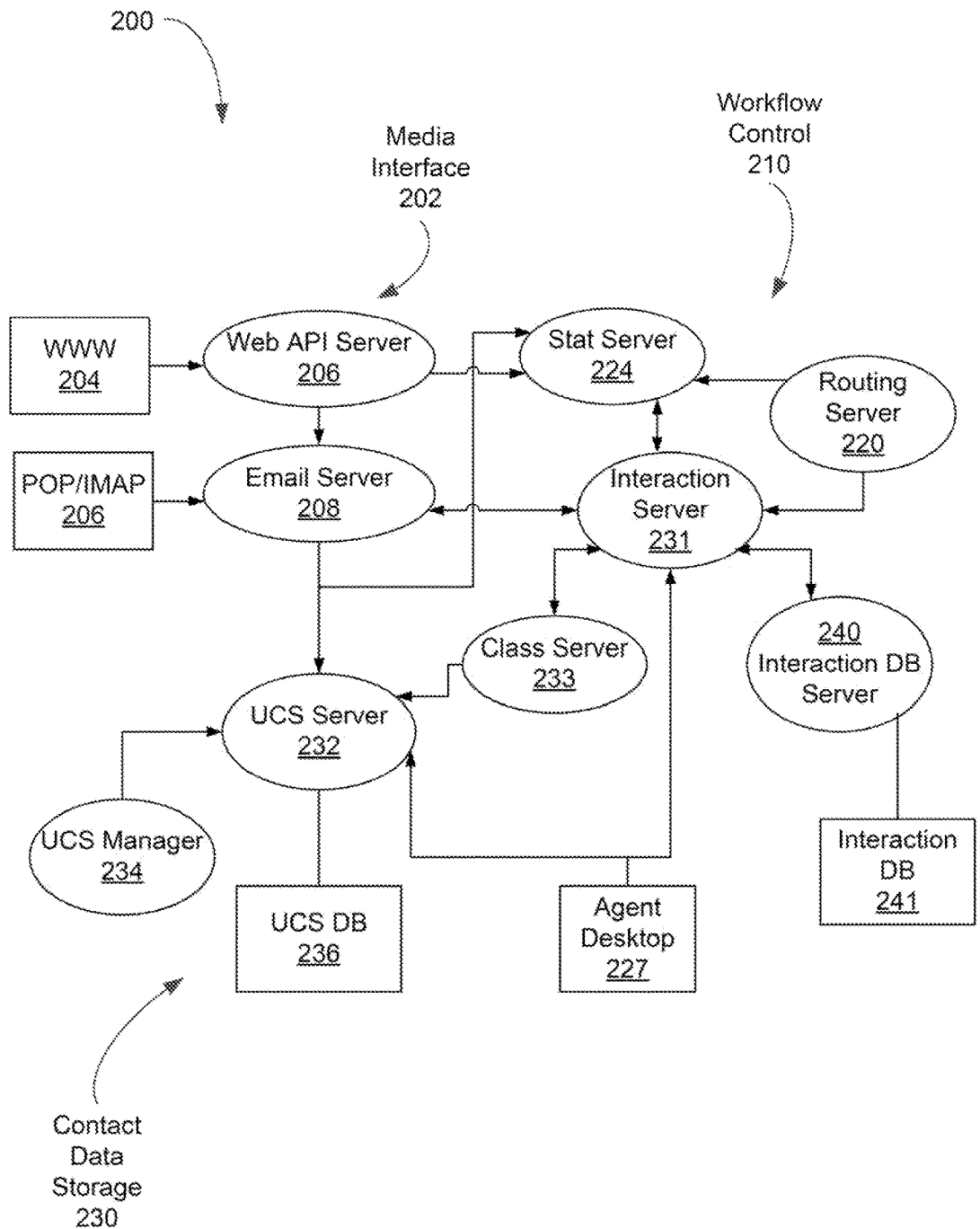
FIG. 2 is a logical diagram illustrating an example of the intermodule communication flow of the contact center system of FIG. 1.

FIG. 2 is a logical diagram of an example of a software architecture 200 of the contact center system of FIG. 1 illustrating an example of communication flow. Architecture 200 includes a media interface portion 202 that may interface with customers through a variety of media. In the example shown, Web API Server 206 receives contacts originating via the World Wide Web 204, such as customers using browser clients to contact the contact center. The Web API Server 206 hosts a collections of servlets and objects hosted with a servlet container. The servlet container processes Java Server Pages (JSPs) and forwards interactions to an appropriate media interface (E-mail Server or Chat Server, for example). The servlets may run in the background and communicate with other components, such as Stat Server 224 to obtain real-time statistics for load balancing, for example, or for pacing, i.e. triggering the display of engagement invites. In other examples, the Web API Server 206 may take the form of a Representational State Transfer (REST) service gateway.

Also shown is Email Server 208, which receives email messages from, for example, an enterprise email server via protocols such as POP3 or IMAP. In this example. Email Server 208 interfaces with an enterprise mail server, via POP3 or IMAP, or a WEB API server to receive email interactions and send out replies or other outbound messages. Email Server 208 transmits operational data such as interaction ID, date received, originating party, etc.) about each interaction to the Workflow Control components 210 including Interaction Server 231. It also transmits the body of the interaction to Universal Contact Server (UCS) 232 for storage in UCS Database 236.

Other media interface servers may be provided for other types of communication in addition to email and web contacts, such as text or voice call communication from customers to the contact center, which are handled in a similar manner to email and web contacts. A chat server, for example, may provide an interface between the Web API Server 206 and Agent Desktop 227 to support chat interactions. The chat server would transmit operation data to Interaction Server 231 and transmit the chat transcript to UCS Server 232.

UCS Server 232 interfaces with UCS DB 235 to store information relating to contacts. The information stored may include contact information, such as names, address, and phone numbers. It may also include contact history relating to previous interactions with this contact, such as agents with whom the contact communicated, background information, or successful service strategies, as well as standard responses or screening rules. UCS Server 232 may also provide tenant-level statistics to State Server 224 and contact information and history to Agent Desktop 227. Some embodiments may work with knowledge management components, such as Classification Server 233, a training server or a knowledge manager, to apply screening rules and perform content analysis. UCS Manager 234 is an administrative user interface for pruning and archiving UCS data which may be run manually or on a scheduled basis by a system tenant.

Interaction Server 231 in the Workflow Control components 210 receives operational data from Media Interface components 202 and stores the operational data in Interaction Database 242 through Interaction Database Server 240 while receiving and transmitting information about interactions. Interaction DB 242 also contains Interaction Buffers, such as input and routing buffers, through which interactions pass as they are being processing by Workflow Control components 210. Interaction Server 231 works with Routing Server 220, UCS Server 232 and Classification Server 233, to route interactions in accordance with an interaction workflow, such as a set of processing rules based on business strategy and priorities. A graphical user interface may be provided that enable a tenant to graphically view, build and edit their strategy and subroutines for routing interactions. Interaction Server 231 may also provide an interface for authenticating and activating agents and establish readiness of agents. It may also provide Input Buffer statistics to Stat Server 224.

Routing Server 220 works with Interaction Server 231 and Stat Server 224 to execute routing strategies. Stat Server 224 accumulates data about places, agents, place/agent groups, Input Buffers, and Tenants and converts the data into statistically useful information. The Stat Server 224 passes data to other components. In particular, Stat Server 224 provides information to Routing Server 220 about agents' capacities in terms of number of interactions, media type of interaction, and similar information for use in driving as routing strategy or routing workflow.

Classification Server 233 applies screening rules and models when triggered to do so by a routing strategy. For example, Classification Server 233 may apply models to categorize incoming tasks for purposes of routing the task. Screening rules and models are stored in UCS DB 236. A training server may be provided to produce the models used by Classification Server 233 and train the system to recognize categories. Producing a model consists of creating a training object, then scheduling and running a training session. Training may be performed by a training server according to settings configured in a knowledge manager. A knowledge manager is a user interface that may be provided for managing standard responses, screening rules, and models. For example, a tenant may utilize a knowledge manager for creating and managing categories, standard responses, screening rules, scheduling classification training sessions, and managing models.

Illustrating an example of handling of an email interaction task, an incoming email at a tenant email server 206 is retrieved by Email Server 208, which sends the body of the email message to UCS Server 232 for storage in UCS DB 236. Email Server 208 sends operational data regarding the email message to Interaction Server 231, which places the operation data representing the email in a Task Object that is placed in an Input Buffer while Interaction Server 231 starts processing the interaction task in according with an interaction task workflow defined for the tenant. Interaction Server 231 submits the interaction task to the strategy associated with the Input Buffer for the tenant. If the strategy indicates that the interaction task is to be routed to an agent, Routing Server 220 works with Stat Server 224 to select an appropriate target agent. Stat Server 224 works with Interaction Server 231 to determine available agent capacities, such as to identify agents with lower assigned workloads. The system may also include a Configuration Server that may maintain information regarding the number of tasks currently assigned to an agent's workbin and the capacity limit for an agent. Routing Server 220 selects a target agent and notifies Interaction Server 231, which sends the operational data or Task Object to a workbin 226(1-n) associated with the target Agent Desktop 227. Agent Desktop 227 will automatically retrieve the body of the email from UCS Server 232 for presentation to the target agent so that the agent may handle the interaction task when they access it from the Agent Desktop. Examples of a workbin include a buffer, index, table, list or other data structure in a computer system that contains each task object or a link, pointer or other reference to each task object that is assigned to the agent corresponding to the workbin. One of skill in the art will readily recognize that a workbin may take many forms.

Figure 3:
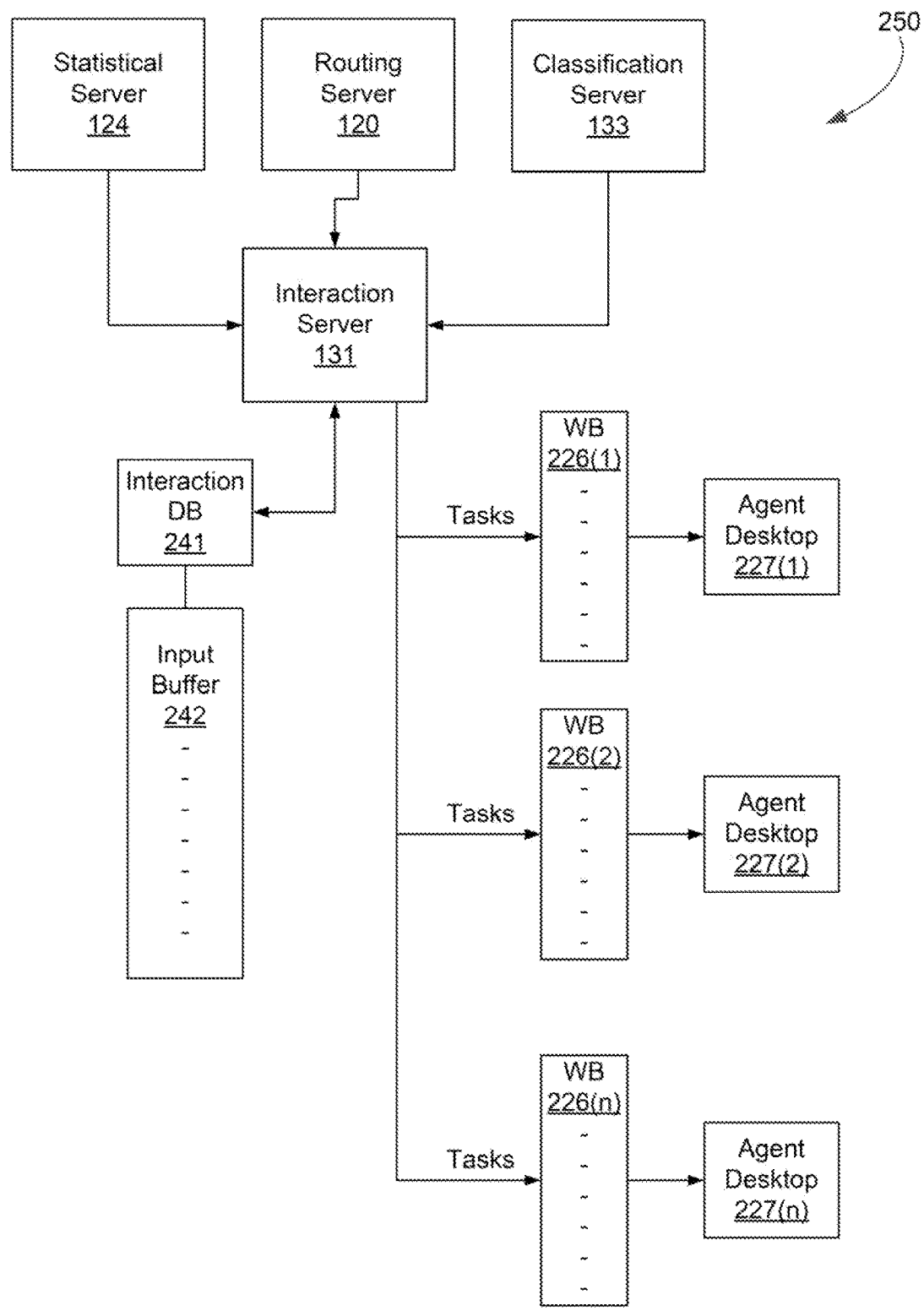
FIG. 3 is a functional block diagram illustrating an example of interaction task routing in the contact center system of FIG. 1.

FIG. 3 is a functional block diagram further illustrates an architecture for routing tasks to multiple agents. In this example, Routing Server 120, Statistical Server 124, and Classification Server 133 work with Interaction Server 131 to route tasks stored in Interaction DB 240 in input Buffer 242, which is a FIFO queue in one example, but may take other forms that are not limited to arrival order. As discussed above, the Routing Server 120 works with Statistical Server 124 and Classification Server 133 to execute a routing strategy or workflow for each task in Input Buffer 242. Based on the routing decision from Routing Server 120, Interaction Server 131 moves a Task Object representing the task to a workbin 226(1-n) corresponding to the agent selected to handle the task. The agent then uses their Agent Desktop 227(1-n) to access the tasks in their workbin 226(1-n).

Figure 4:
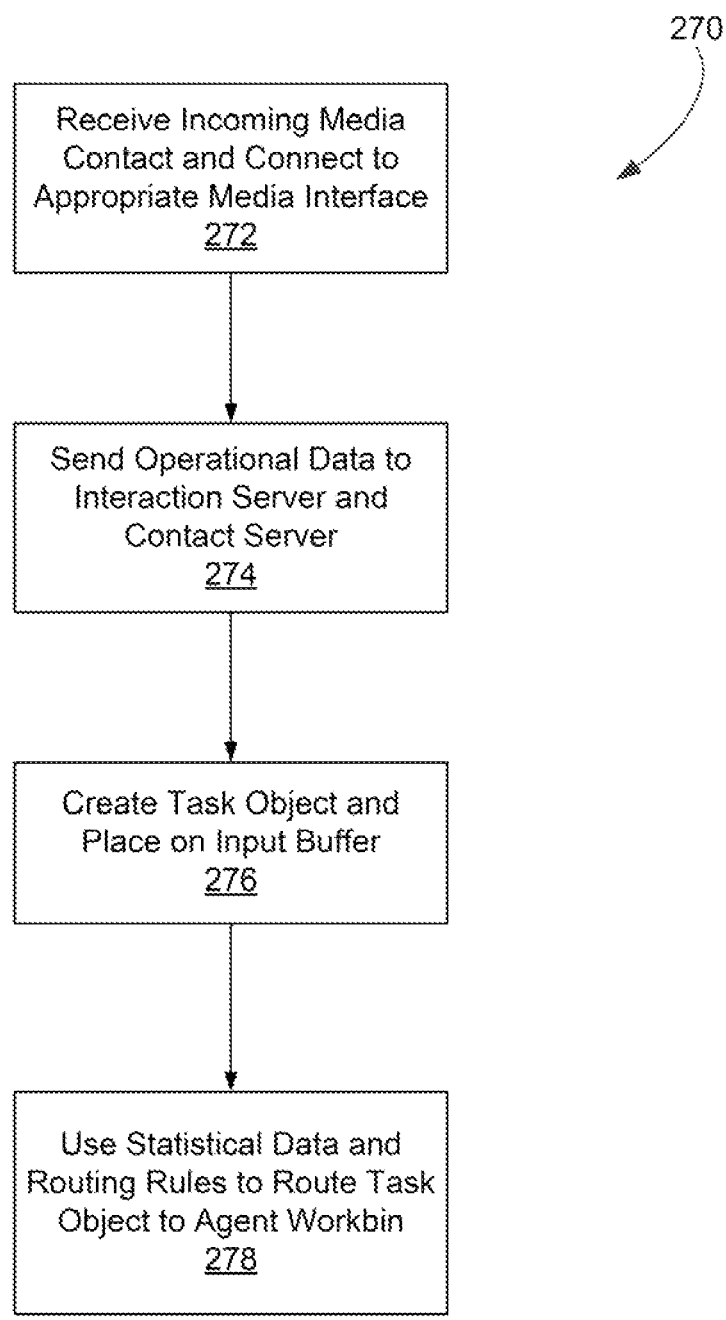
FIG. 4 is a control flow diagram illustrating an example of the control flow for routing an interaction task in the contact center system of FIG. 1.

FIG. 4 is a control flow diagram illustrating one example of a process 270 for routing incoming tasks. At step 272, an incoming media contact is received and connected to an appropriate media interface, e.g. email to an email server, chat to it chat server, etc. At step 274, the media interface that receives the incoming contact at step 272 sends operational data for the incoming contact to the Interaction Server and forwards the body of the contact, e.g. the text, etc., to the Contact Server. At step 276, a Task Object is created that represents the incoming media contact and the Task Object is placed in the Input Buffer. At step 278, statistical data, e.g. workloads, availability, etc., and routing rules are used to route the Task Object to a selected agent workbin.

Figure 5:
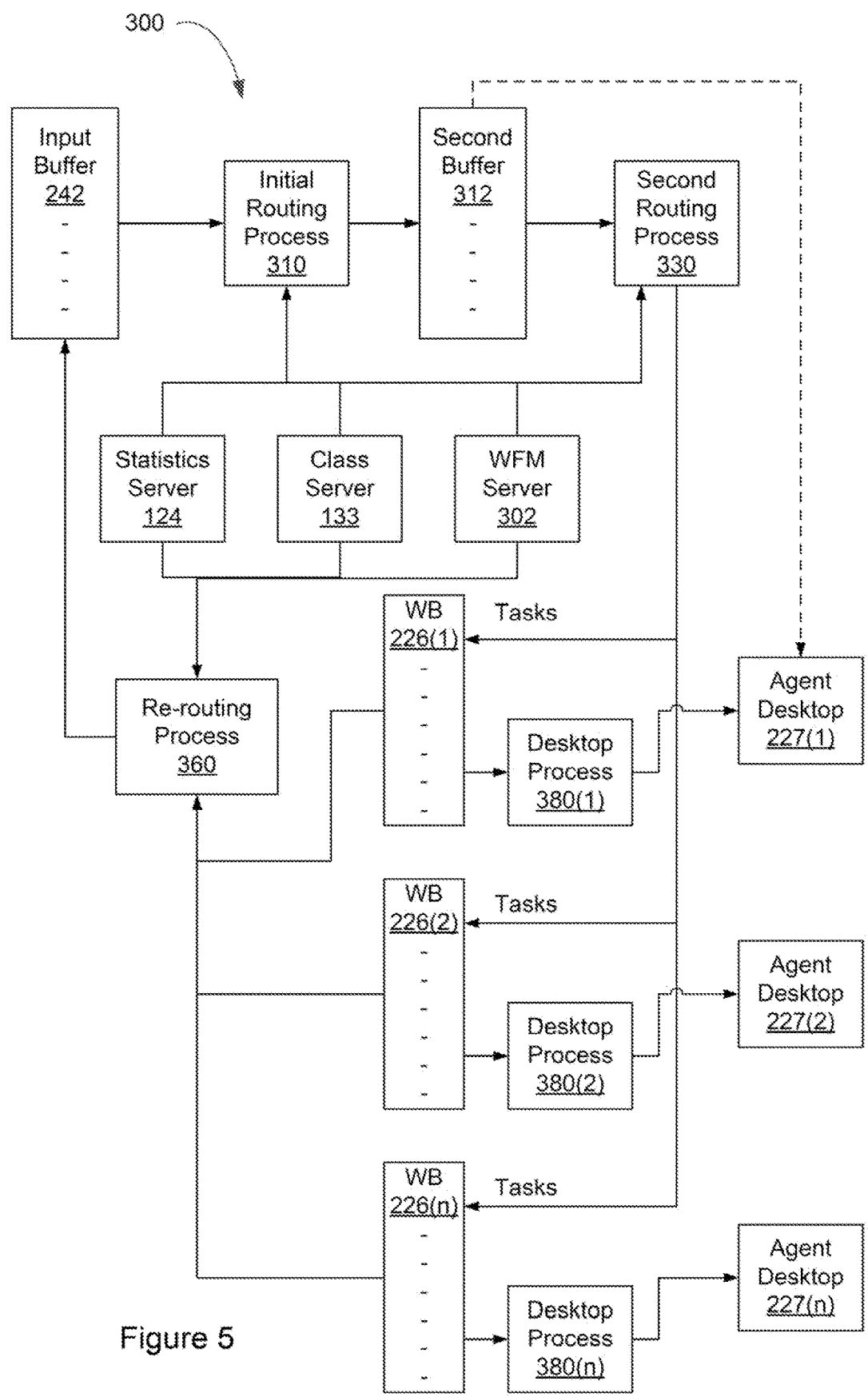
FIG. 5 is a functional block diagram illustrating an example of interaction task routing in as contact center system in accordance with certain aspects of the present invention.

FIG. 5 is a functional block diagram illustrating an example of a routing process 300 in accordance with certain aspects of the present invention. Similar to the system illustrated in FIG. 3, Task Objects for incoming interactions or tasks are routed from Input Buffer 242 to Workbins (WBs) 226(1-n) corresponding to Agent Desktops 227(1-n) for handling by agents. In this example, tasks in Input Buffer 242 are processed by an Initial Routing process 310, placed in a Second Buffer 312, and further subjected to Second Routing Process 330 to place the tasks in WBs 226(1-n). Initial Routing Process 310 and Second Routing Process 330, in this example, execute within a Routing Server and an Interaction Server.

Initial Routing Process 310 analyzes each Task Object in Input Buffer 242 and its associated body to develop metadata pertaining to the task. For example, if the task is an interaction that is directed to a particular recipient, e.g. the Chief Executive Officer, then the destination for the interaction may be broadened to include additional recipients with relevant expertise, e.g. the Chief Technical Officer or the Chief Financial Officer, or to include a recipient address set-up to address an issue raised in the interaction, e.g. technical support or accounting. In another example, the status of the original destination of the interaction may be checked to determine availability and, if unavailable, then additional available recipients may be added as routing target. In a other aspect, analysis of the interaction may indicate a particular skill that may be useful to handling the interaction, e.g. language or technical skills. Initial Routing Process 310 adds metadata identifying additional recipients, skills, etc. For example, if analysis indicates the interaction includes the Spanish language, then a keyword "Spanish" may be added as metadata for the Task Object. In still another example, the interaction may be identified as a follow-up to a previous interaction, in which case the interaction may be marked as a follow-up and/or the agent who handled the previous interaction interaction may be identified in the metadata. The Task Object with the added metadata is then placed in Second Buffer 312.

Second Routing Process 330 takes the Task Objects in Second Buffer 312 and makes a routing decision based on the Task Object including the added metadata and current status information. For example, Second Routing Process 330 may utilize information from Statistics Server 124, Class Server 133, and a Workforce Management (WFM) Server 302 that may provide information regarding a tenant's workforce. For example, a server, such as a configuration server or WFM Server 302, may provide information regarding staff scheduling and/or the particular skills of individual agents (e.g. language or technical skills), scheduling information e.g. agent starting, ending and break times), or other information that may be useful to improve the efficacy of routing tasks for the tenant. Data from Statistics Server 124 may include the current work-rate for agents in order to route tasks to agents who are likely to dispatch the task within selected performance criteria for the tenant. Examples of selected performance criteria may include compliance with a Service Level Agreement (SLA) specification regarding time until completion, resolution on first interaction task, and combinations of these and other criteria. Data from the Classification Server 133 may be utilized to establish a priority for a task, such as high priority for real-time tasks, e.g. a live interaction with a customer, and a lower priority for less time sensitive tasks, e.g. an email interaction with a customer, or to identify a standard response for the class of task. Data from WFM Server 302 may be utilized to identify agents with skills matching the metadata for the Task Object, e.g. language or technical support skills, as well as scheduling information for an agent, such as agents scheduled to be available soon, e.g. beginning their shift or ending their break, and agents who will be unavailable, e.g. ending their shift or beginning their break. Thus, tasks are less likely to be routed to the work-bin of an agent who is unlikely to dispatch the task within required performance parameters at current and historical rates of work for that agent or an agent without appropriate skills for the task or interaction.

Re-routing Process 360 is involved in re-routing tasks from WBs 226(1-n). For example, if an agent is backlogged, then Re-routing Process 360 may detect that the agent is unlikely to dispatch a high priority within performance parameters and will move the Task Object from the agent's work-bin back to Input Buffer 242 for routing to a different agent. Alternatively, Re-routing Process 360 may occur at periodic intervals, e.g. every fifteen minutes, at parametrically determined times, e.g. based on current and historical performance data, or event-driven, e.g. an agent becomes available or unavailable. In some embodiments, Re-routing Process 360 may move all unattended tasks from WBs 226(1-n) to Input Buffer 242 for re-routing based on current conditions.

Note that in some embodiments, Agent Desktop 227(1-n) may enable an agent to manually select Task Objects, such as tasks in Second Buffer 312, for handling, as illustrated by the broken fine from Second Buffer 312 to Agent Desktop 227(1), which results in the associated Task Object being moved to the agent's Workbin 226(1-n) independent of the routing processes of routing process 300. For example, agents may have access to group workbins from which the agents can manually pull tasks. In still another embodiment, when an agent starts work on an interaction task for a given customer, the agent can request the system to assign active interaction tasks for this customer to the agent's workbin.

Figure 6:
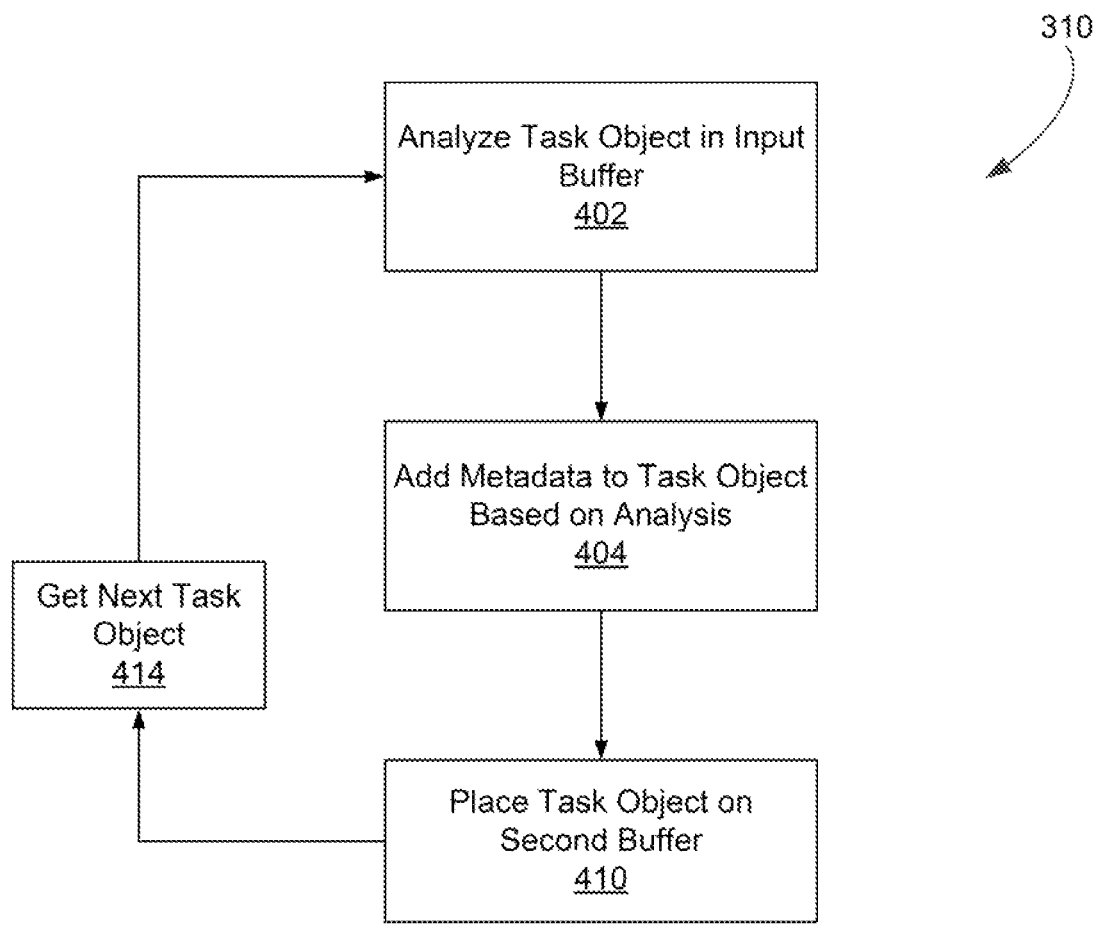
FIG. 6 is a control flow diagram illustrating one example of the Initial Routing Process in FIG. 5.

FIG. 6 is a control flow diagram illustrating one example of an initial routing process 310 in FIG. 5. In this example, the initial routing process 310 analyzes the Task Objects in Input Buffer 242. At step 402, a Task Object is analyzed from Input Buffer 242 to identify characteristics of the task. For example, if the task is an interaction, the analysis may seek to determine the nature of the interaction, e.g. technical support, billing inquiry, new service inquiry, etc. The analysis may also look at the intended recipient, e.g. CEO, CTO, or a particular agent. The analysis may take place at fine levels of granularity, e.g. software problem, hardware problem, problem with a specific application, problem with a specific piece of hardware. At step 404, metadata is added to the Task Object based on the results of the analysis step. For example, keywords, tags or classes may be added representing the type of task, e.g. "support", "finance", or "CEO", or skill group for handling the task. In the case where the task is an interaction, the interaction ay be identified as a first time contact or a repeat contact. This step may also add recipients, such as adding a group address, e.g. support@corp.com or legal@corp.com, or different individuals, e.g. an assistant to the CEO. As another example, analysis step 402 may determine that the intended recipient is unavailable, e.g. based on data from Statistics Server 124 or WFM Server 302, and add another recipient who is available to handle the task. At step 410, the Task Object with the added metadata is placed in Second Buffer 312 for further routing. Another Task Object is obtained at step 414 and the process is repeated such that the Task Objects in Input Buffer 242 are processed.

Figure 7:
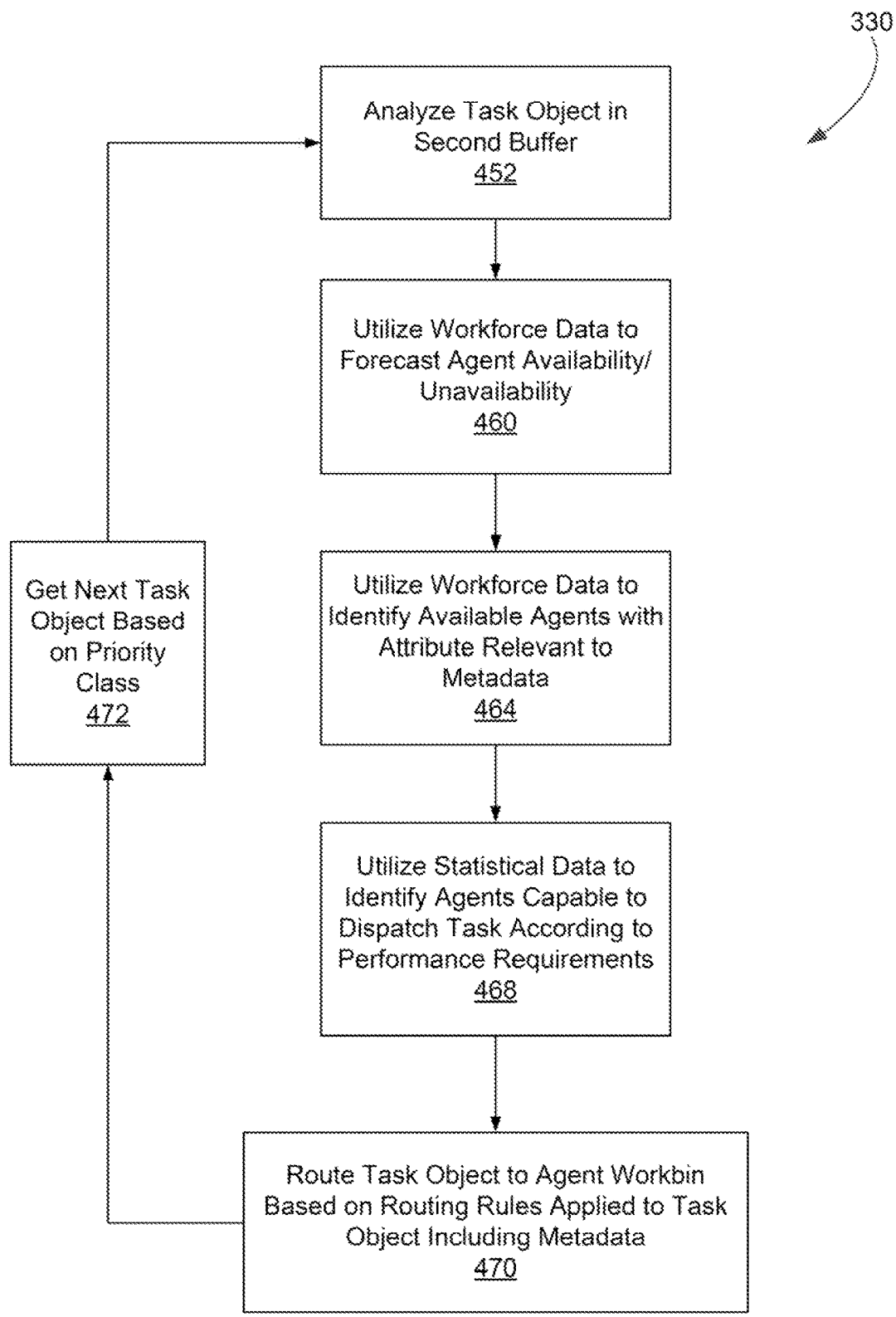
FIG. 7 is a control flow diagram illustrating an example for Second Routing Process in FIG. 5.

FIG. 7 is a control flow diagram illustrating an example for Second Routing Process 330 from FIG. 5. At step 452, as Task Object from Second Buffer 312 is analyzed for routing to a Workbin 226(1-n). In this example, at step 460, a forecast may be performed based on workforce data from WFM Server 302 to identify Agents who will be available or unavailable to handle the task. For example, agents who are close in time to the end of their shift may be identified and their Workbins excluded from routing selection and agents who will soon begin their shift may be identified and their Workbins added to consideration for routing selection.

At step 464, workforce data from WFM Server 302 is utilized to identify agents with one or more attributes relevant to the metadata in the Task Object. For example, if the task is an interaction and the metadata indicates that the interaction is in a particular language, then agents with skill in that language may be identified. Or, in another example, if the metadata indicates that the task may involve a particular technical skill, then agents with the technical skill may be identified.

At step 468, statistical data from statistics server 124 is utilized to identify agents whose performance statistics indicate that they will dispatch the task in time to meet performance specifications, standards or guidelines that have been determined for the system. These statistics may include the number of tasks assigned to each agent's workbin, the rate at which individual agents are processing tasks, or the rate at which individual agents have processed a particular type of transaction, such as the type of task indicated by metadata in Task Objects. For example, statistics server 124 may maintain task completion data for agents that may include time duration and quality feedback data. In some examples, performance specifications, standards or guidelines may be defined for a system, a customer, or a group and may be specific to a particular characteristic of a task, e.g. a short duration performance specification is applied to a telephone interaction while a longer duration performance specification is applied to email interactions. If statistical data for an agent indicates that the agent is unlikely to initiate or complete processing of a task within the time indicated for one or more performance specifications, then that agent may be excluded from consideration for routing of the task.

At step 470, the Task Object is routed to an agent Workbin 226(1-n) based on routing rules or workflow strategies applied to the Task Object including its metadata. The routing rules or workflow strategies may, for example, be defined via a user interface that permits an administrator to define the rules and strategies, which are maintained by routing server 120. Note that, in this example, agents may have been added or removed from consideration for routing at steps 460, 464 and 468. Thus, the results of the routing process at step 470, which may be similar to routing and workflow strategies presently utilized for routing tasks, are enhanced by the addition of metadata as well as the addition and removal of agents from the pool of available targets.

At step 472, the next Task Object in Second Buffer 312 is obtained and control flow branches to step 452 to process the next task using Second Routing Process 330. Note that, as one of ordinary skill in the art will recognize, more or fewer steps than those shown in the example of FIG. 7 may be utilized in other examples without departing from certain aspects of the invention.

Figure 8:
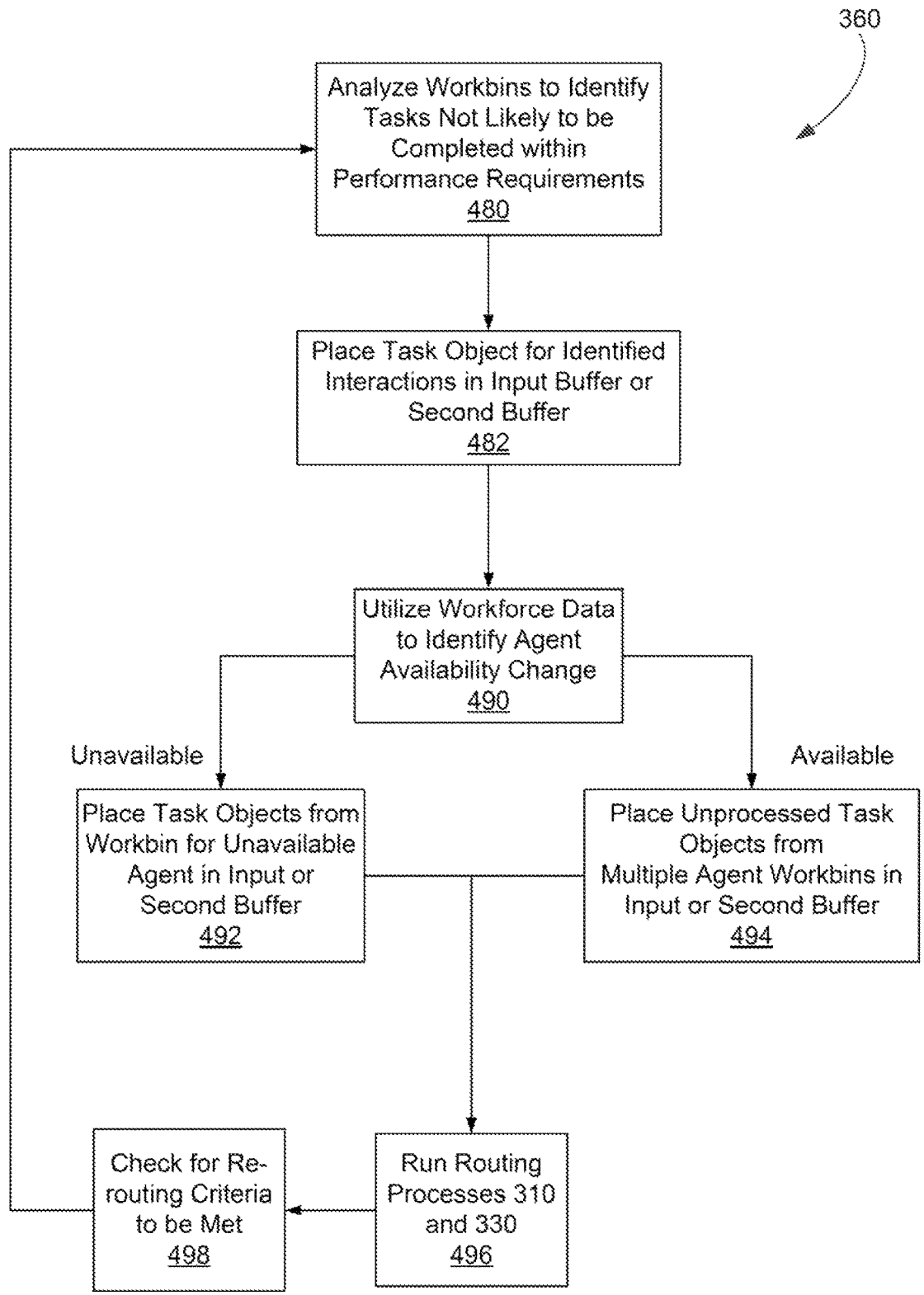
FIG. 8 is a control flow diagram illustrating an example of Re-Routing Process in FIG. 5.

FIG. 8 is a control flow diagram illustrating an example of Re-Routing Process 360 in FIG. 5. Re-Routing Process 360 may be invoked on a number of bases, including, for example, periodic, event and parametric.

At step 480, in this example, Task Objects in Workbins 226(1-n) are analyzed to identify tasks that are not likely to be completed within performance specifications, standards or guidelines that have been determined for the system. One example of this analysis is to analyze the processing rate for the agent and predict which tasks will not be addressed within the performance parameter. This example may be extended to consider the rate for an agent to process tasks of the types found in Workbins 226(1-n). At step 482, in this example, the Task Objects for the tasks identified in step 480 are placed in Input Buffer 242 for processing via Initial Routing Process 310 and Second Routing Process 330 as described above.

At step 490, workforce management data from WFM Server 302 is utilized to identify agents who have had a status change or are about to have a status change, e.g. available to unavailable or unavailable to available, or a change in availability, e.g. an agent's meeting is cancelled. If an agent becomes or will soon be unavailable, e.g. end of shift or beginning of break, control flow branches to step 492, were the Task Objects from the unavailable agent's Workbin are moved to either Input Buffer 242 or Second Buffer 312, depending on the buffer utilized for re-routing. If an agent becomes or will soon become available, e.g. beginning of shift or end of break, then control flow branches to step 494, where, in this example, Task Objects for unprocessed tasks are moved from the Workbins 226(1-n) of multiple agents, e.g. an entire group of agents or department of agents, to Input Buffer 242 or Second Buffer 312. Alternatively, an agent becoming available may trigger an analysis of other agent's workbins to identify task objects to assign to the newly available agent.

At step 496, in this example, Initial Routing Process 310 and Second Routing Process 330 are run to re-route the Task Objects in input Buffer 242 to Workbins 226(1-n), This results in tasks being re-routed on the basis of current conditions in the routing system.

At step 498, as noted above, Re-Routing Process 360 may be run on a variety of bases, such as periodic, event and parametric. For example, Re-Routing Process 360 may be invoked at regular time intervals, e.g. every thirty minutes. In another approach, an event, such as a status change when one or more agents become available or unavailable, may cause Re-routing Process 360 to be invoked. In yet another approach, one or more parameters may be checked to determine whether the Re-Routing Process 360 is run, such as when variability in the loads in Workbins 226(1-n) exceeds a predetermined or statistically determined parameter, e.g. some Workbins have 30% more tasks than other Workbins. Multiple approaches may be combined in the considerations of step 498 and other considerations may be utilized. Based on the determination at step 498, control flow will branch to step 480 to perform process 360.

One of ordinary skill in the art will recognize that more or fewer steps than those shown in the example of FIG. 8 may be utilized in other examples without departing from certain aspects of the invention. Also, other approaches may be utilized without departing from the teachings of certain aspects of the present invention. For example, in a simplified, all the unprocessed Task Objects in Workbins 226(1-n) may be moved to Input Buffer 242 at a preset time interval, e.g. 15 minutes.

Figure 9:
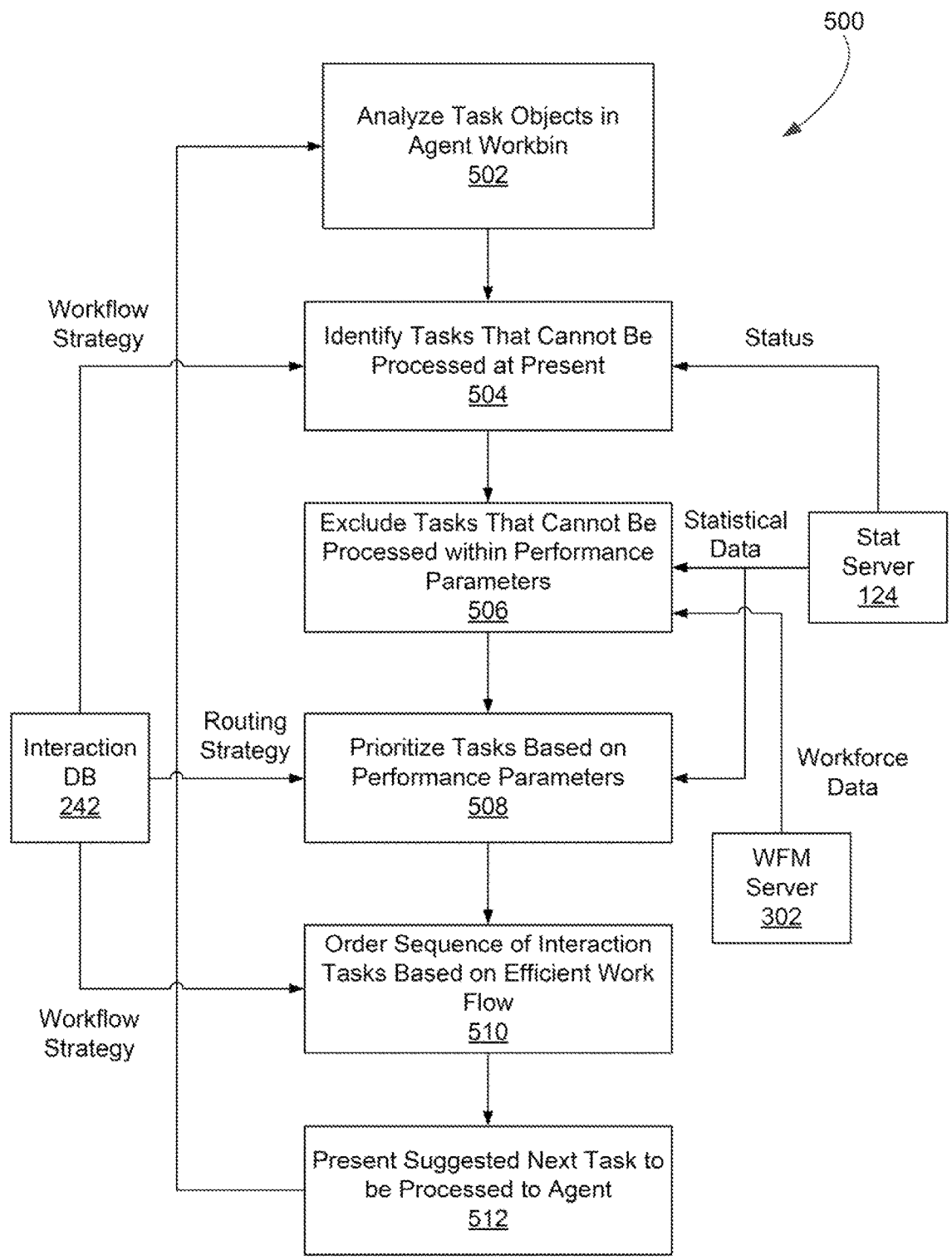
FIG. 9 is a control flow diagram illustrating an example of the control flow for a Workbin Presentation Process.

FIG. 9 is a control flow diagram for an example of a Workbin Presentation Process 500 that may run, for example, in Agent Desktop 227(1-n), in Routing Server 120 or 220, or a combination of servers and devices to present suggestions to an agent for processing the tasks in their Workbin 226(1-n). It is not unusual for an agent to have dozens or even hundreds of assigned tasks in the agent's Workbin 226(1-n). Agents frequently devote significant time to assessing their Workbin 226(1-n) in order to select the next task to process. Workbin Presentation Process 500 may assist an agent by automatically analyzing their Workbin 226(1-n) and prioritize or suggest one or more tasks to address next.

At step 502 of Workbin Presentation Process 500, the Task Objects in the Agent's Workbin 226(1-n) are analyzed on the basis of priority, urgency or criticality. For example, the Task Objects may be ordered on the basis of a priority level or an indication of time sensitivity, e.g. phone calls having a higher time sensitivity than email messages.

At step 504, tasks that depend upon a condition to be met before they can be processed may be identified removed from consideration. In some examples, a workflow strategy defined by an administrator and stored in Interaction Database 241 determines a relationship between tasks, such as a sequence in which tasks are to be completed. For example, for as job composed of multiple smaller tasks, a workflow strategy may describe the relationship and order between the multiple tasks. Also, some examples may utilize status data from Statistical Server 124 to identify when a task cannot be performed. For example, a workflow strategy for tasks for the processing of documents for a loan application interaction indicates that the process depends upon approval by an authorized agent, e.g. an underwriting agent, whose status is indicated as unavailable so that the tasks dependent upon the approval task may be set aside until the approval condition is met. Note that some examples of workflow strategies may provide for situational re-evaluation, such as when current conditions change and a workflow strategy is configured to take different action due to the changes circumstances.

At step 506, tasks in Workbin 226(1-*n*) that cannot be processed by the agent within specified performance parameters may be excluded from consideration. In some examples, statistical data relating to processing by the agent may be provided by Statistical Server 124. For example, if the task cannot be completed by the particular agent within a time window defined for such tasks given higher priority tasks in the Workbin 226(1-*n*), then the task may be excluded and, in some examples, the Task Object returned to Input Buffer 242. In another example, it may be determined from data from WFM Server 302 that as task cannot be completed before the agent's next break or end of shift and excludes the task from consideration.

At step 508, Task Objects in Workbin 226(1-*n*) may be prioritized on the basis of performance parameters specified for the tasks. For example, tasks that must be completed within a shorter period of time or that have aged such that they are approaching the end of the time period specified for completion may be prioritized higher than tasks with more time remaining for completion within the specified performance parameters. By way of further example, a live telephone call or an email that is required to be handled within one hour and was received fifty minutes ago may be given relatively high priority, while a task that may be addressed in two days may be given lower priority. In some examples, this determination may rely on statistical data provided by Statistical Server 124 or data from other servers as well as a routing strategy defined by an administrator and stored in Interaction DB 241.

At step 510, Task Objects in Workbin 226(1-*n*) may be ordered on the basis of efficient work flows for handling the particular tasks. An efficient work flow for certain tasks may, for example, be defined by an administrator and stored in Interaction DB 241 for use in ordering a sequence of tasks. For example, where a screening task, e.g. account information collected, must be performed before a resolution task, e.g. technical support, may be performed, the screening task interaction may be ordered ahead of the resolution task interaction. In another example, the tasks are ordered based on similarity, e.g. grouping tasks of the same or a similar type, to avoid the agent inefficiently switching amongst tasks having significantly different characteristics. Or, in yet another example, multiple interactions that are related, e.g. multiple steps to addressing an issue, may be identified and presented so that the agent can address some or all the interaction tasks for the issue. In still another example, where multiple code development tasks are to be performed, but certain coding tasks, e.g. module specifications defined, must be performed before other tasks, e.g. module coded.

At step 512, one or more recommended tasks, the results of the preceding analysis steps, are presented to the agent for selection via the agent's desktop 227(1-*n*). The results may be presented in a variety of ways, such as a single recommended task or an ordered list of tasks. For example, a graphical user interface of the agent desktop 227(1-*n*) may present an icon representing a suggested Task Object, which the agent may select in order to begin processing. This approach may be useful in reducing the amount of time that agents devote to studying their Workbin 226(1-*n*) in order to determine the next task to handle, which is often a significant amount of time.

Note that some implementations may permit a task object to be assigned to more than one workbin, i.e. the same task is distributed to multiple agents. In such a case, each agent may be a different strategy or SLA that results in different priorities for different agents.

Figure 10:
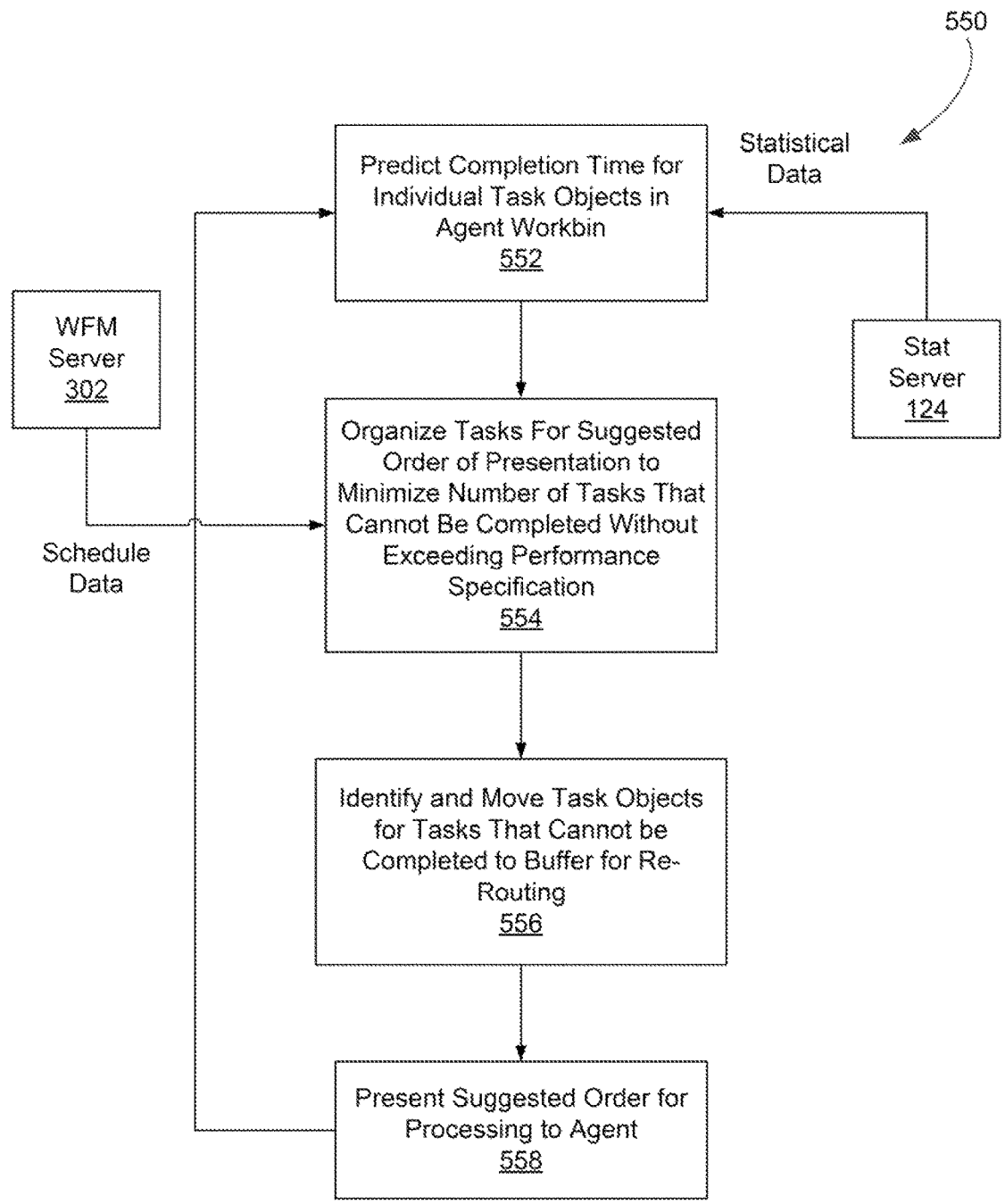
FIG. 10 is a control flow diagram illustrating another example of the control flow for a Workbin Presentation Process.

FIG. 10 is a control how diagram for another example of a Workbin Presentation Process 550 that may run, for example, in Agent Desktop 227(1-*n*), in Routing Server 120 or 220, or a combination of servers and devices to present a suggested order to an agent for processing the tasks in their Workbin 22(1-*n*), Workbin Presentation Process 550 automatically analyzes their Workbin 226(1-*n*) to identify a suggested order for processing that minimizes the tasks that cannot be completed within a performance specification, e.g. SLA, and initiates reassignment of Task Objects that cannot be completed.

At step 552 of Workbin Presentation Process 550, predicted completion times for the Task Objects in the Agent's Workbin 226(1-*n*) are determined on the basis of statistical data from Stat Server 124. For example, the agent's historical average time for completion for the same type as the Task Object may be utilized to predict the time for completion of the present Task Object. At step 554, the Task Objects are organized for a suggested order of presentation such that, in this example, the number of Task Objects that cannot be completed by this agent without exceeding the performance specification are minimized. This assessment may utilize schedule data from by WFM Server 302 to determine the scheduled available time for the agent, i.e. the agent has three hours remaining in their shift and the suggested order of presentation is organized to fit task completion times into this time interval. At step 556, the Task Objects for the tasks that cannot be completed by this agent within the performance specification are moved to a buffer, such as Input Buffer 242 or Second Buffer 312, depending upon implementation, so that the tasks can be rerouted to other agents through the routing processes and variations discussed above. At step 558, the suggested order for processing is presented to the agent for the agent to select a task. Note that aspects of this example and the example of FIG. 9 may be combined.

Figure 11:
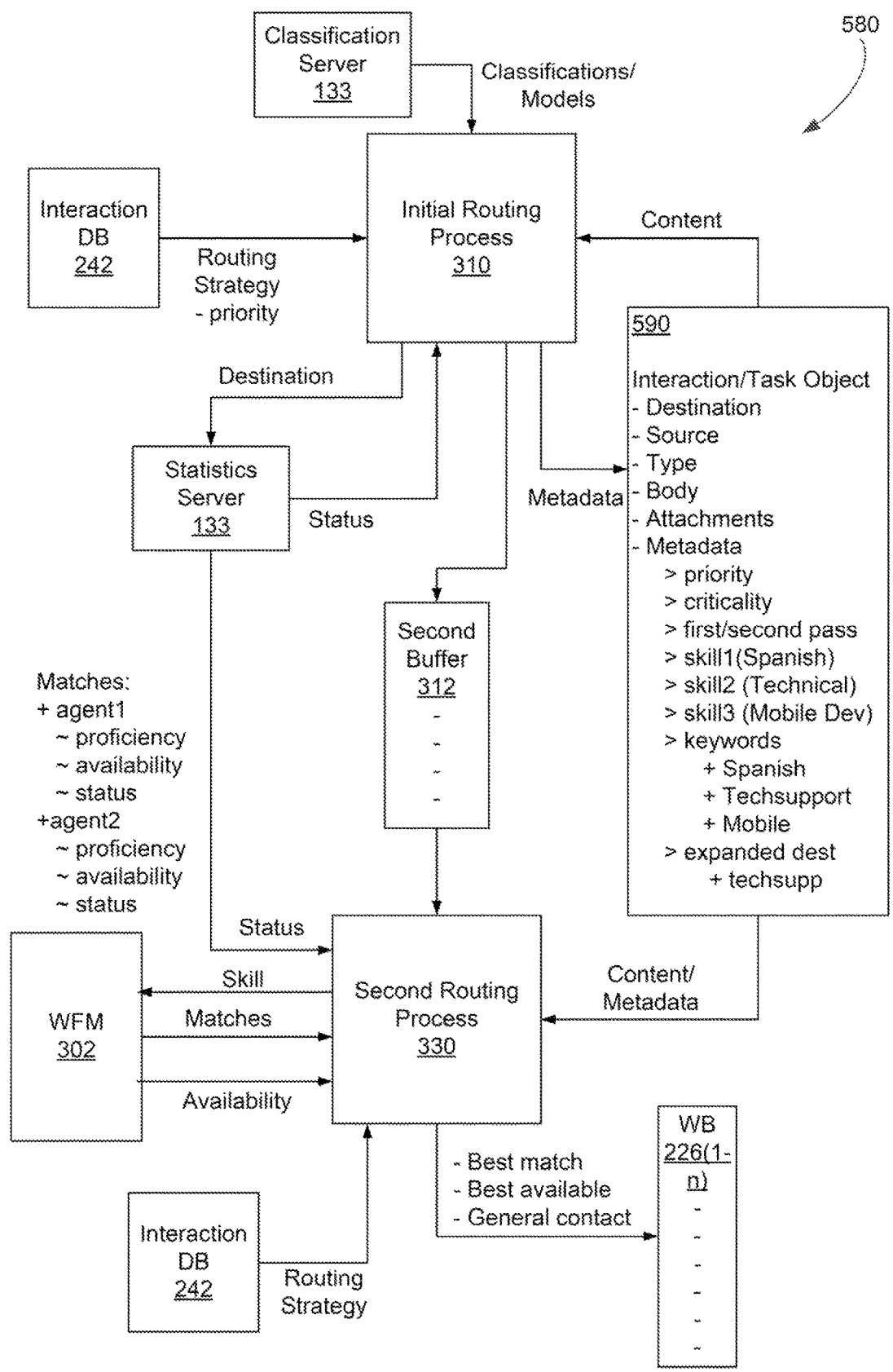
FIG. 11 is a schematic diagram illustrating an example of the routing processing for a Task Object.

FIG. 11 is a functional block diagram further illustrating one example 580 of routing processing as described herein. In this example, Initial Routing Process 310 processes Task Object 590 obtained from Input Buffer 242 beginning with analysis of the content of Task Object 590, e.g. destination address, source address, type of task or interaction, body of the task or message, and attachments. Initial Routing Process 310 applies classifications and/or models defined in Classification Server 133 to the content to identify characteristics of the Task Object, e.g. type, skill, class, etc., which are added to Task Object 590 as metadata. Initial Routing Process 310 may also apply a model from Classification Server 133 that results in the destination being automatically expanded, e.g. a message to the CTO may have a "techsupport" group address automatically added to the metadata. Or the process 310 may utilize status data from Statistics Server 133 to determine that the stated destination address is unavailable and triggering the process 310 to add an additional destination address that is currently available. Initial Routing Process 310 may utilize classifications or models from Classification Server 133 and/or routing strategy information from Interaction DB 242 to assign a priority and time criticality to the interaction or task that are added to the metadata of the Task Object 590. Metadata may also be included in Task Object 590 that indicates whether this is the first time the object has gone through the overall process, e.g. a newly originated interaction or task, or whether this is the second or later pass through the overall process.

In the example of FIG. 10, Initial Routing Process 310 analyses the content of Task Object 590 and determines that the interaction/task is likely in the Spanish language, which results in metadata for skill1 to indicate a classification type of "Spanish". Alternatively, or in addition, "Spanish" may be added as a keyword in the Task Object 590. In addition, Initial Routing Process 310 identifies that the interaction/task is likely related to technical support and mobile devices, which results in skill2 indicating a classification type of "Technical" and skill3 to indicate classification type "Mobile". Alternatively, or in addition, the keywords "Techsupport" and "Mobile" may be added to the metadata keywords. Further, in this example, Initial Routing Process 310 applies a model to the Task Object 590 that causes a "Techsupp" group destination to be automatically added to the Task Object 590. The Task Object 590 is then placed on the Second Buffer 312.

Second Routing Process 330 obtains Task Object 590 from Second Buffer 312 and applies routing rules and strategies from Interaction DB 742 to the content and metadata from Task Object 590 and also utilizes status data, such as current agent workload, workforce data, such as hours of operation or changes in agent skills, and business rules, such as automatic response models. For example, a routing strategy pertaining to the Type field of Task Object 590 or pertaining to skill classifications. In this example, Second Rotating Process 330 utilizes a routing strategy based on the classification of skill1 from the metadata to rotate the task. Process 330 uses the classification types from the metadata for skill1, skill2 and skill3 to query WFM Server 702 to identify agents who possess relevant skills or are members of groups relevant to the skills, such as technical support. Alternatively, this type of data may be store a configuration server. The data returned by WFM Server 302, identifies two agents, agent1 and agent2, who possess the skills from the metadata and their information includes proficiency in the skills (1-4 skill level), availability (e.g. on duty until 1400 hours), and current status (e.g. busy). In an alternative architectural example, this information may be maintained in Stat Server 124 and accessed by Routing Server 120, which executes strategy queries to obtain the information. Second Routing Process 330 applies routing rules and strategy stored in Interaction DB 242 to the content and metadata from Task Object 590 and the data from WFM Server 302 to route the interaction or task to one of the Workbins 226(1-n).

For example, Second Routing Process 330 may route the Task Object 590 to the Workbin 226(1-n) of the agent with the best match, e.g. highest proficiency score for one or more skills or highest cumulative proficiency score for the skills. If the interaction or task is time critical, then Task Object 590 may be routed to the agent with the highest proficiency score who will be available for at least thirty minutes. If no specialized agent is available for a time critical task, then the task may be routed to a Workbin for a general group, such as technical support.

In a specific example, the routing strategy for Classification "Spanish" first searches for agents who have Spanish language skills and orders them according to their language proficiency. Because of the skill2 and skill3 classifications, the agent order is then ordered by their technical support proficiency and mobile device proficiency. If the metadata indicates the task is not time critical, the routing strategy routes the Task Object to Workbin of the agent with the highest combined proficiency. If the task is time critical, then the routing strategy routes the Task Object to the Workbin of the agent with the highest proficiency who is currently available. If not proficient agent is available, the routing strategy routes the task to a Workbin for the technical support group address.

Note that in some implementations, an agent may have the capability to return a task object assigned to the agent's workbin by transferring the task object back to the input buffer or second buffer or, in another example, transfer the task object to the workbin of another agent, e.g. an agent with particular expertise relevant to the task. In yet another example, an agent may update the task object metadata, e.g. add another agent's identifier to the metadata, and then return the task object to the input buffer or second buffer for reassignment.

One of ordinary skill in the art will readily recognize that a variety of rules and strategies may be defined, and utilized for the present system and that both the metadata and the routing strategies may be configured to be more or less data rich, e.g. more classifications analysis may be configured for the system resulting in more metadata classifications or more narrowly defined classifications and the routing strategies configured to utilize the additional or more refined classifications for routing.

Figure 12:
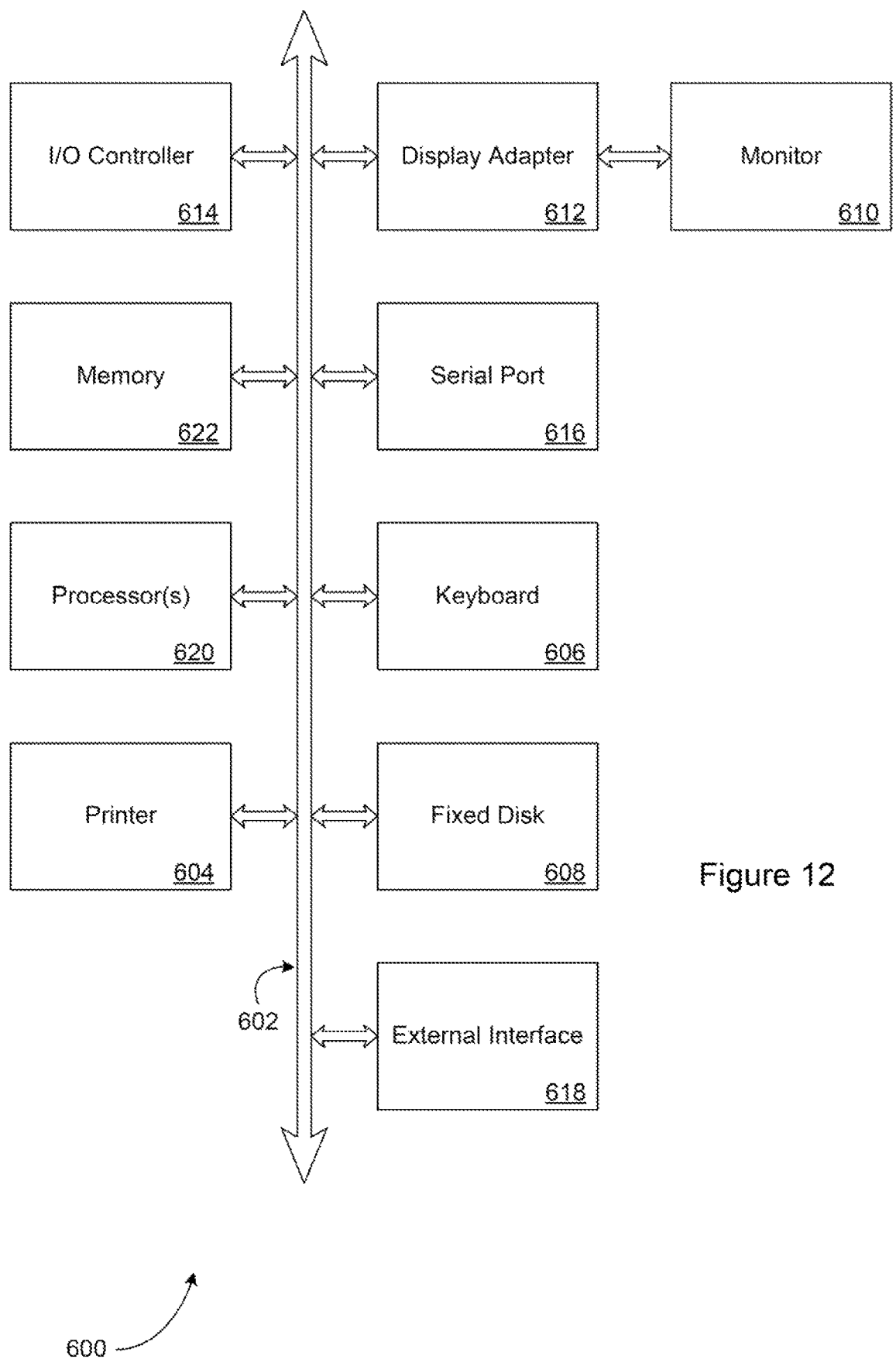
FIG. 12 depicts aspects of elements that may be present in a computer device and/or system configured to implement a method, system and/or process in accordance with some embodiments of the present invention.

FIG. 12 depicts aspects of elements that may be present in a computer device and/or system configured to implement a method, system and/or process in accordance with some embodiments of the present invention.

In accordance with at least one embodiment of the invention, the system, apparatus, methods, processes and/or operations for the systems described above may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system.

As an example, FIG. 12 depicts aspects of elements that may be present in a computer device and/or system 600 configured to implement a method and/or process in accordance with some embodiments of the present invention. The subsystems shown in FIG. 12 are interconnected via a system bus 602. Additional subsystems include a printer 604, a keyboard 606, a fixed disk 608, and a monitor 610 which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 12 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hard and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM) a magnetic medium such as hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

All references, including publications patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A system for routing tasks to multiple agents, the system comprising one or more servers, each server having at least one processor for executing stored instructions to perform operations, where the one or more servers are configured to perform the following operations:

receive one or more tasks and, for each task, create a task object representing the task and a content of task, and place the task in an input buffer;

analyze the content of each task object in the input buffer, determine at least one pre-defined classification that is relevant to the content of the task object and add the pre-defined classification to metadata of the task object, and move the task object from the input buffer to a second buffer, wherein the analyzing of the content of the task object in the input buffer includes automatically adding a destination as part of the metadata added to the task object;

analyze the content of a task object in the second buffer, use the pre-defined classification in the metadata of the task object to search workforce management data representing agent characteristics, and identify one or more agents for assignment of the task object based on at least a partial match of the pre-defined classification with the agents' workforce management data, wherein the analyzing of the content of a task object in the second buffer includes utilizing statistical data relating to agent performance for identifying at least one agent capable of processing the task within a pre-defined performance criterion; and apply a pre-defined routing strategy to the task object in the second buffer to further identify one of the one or more agents identified for assignment of the task object and route the task object to a workbin corresponding to the one of the one or more agents.

2. The system of claim 1, where the one or more servers are further configured to perform the following:

on at least one of a periodic, parametric and event basis, move unprocessed task objects from agent workbins to one of the input buffer and second buffer for re-assignment.

3. The system of claim 2, where the event basis further comprises a status change of at least one agent from unavailable to available.

4. The system of claim 2, where the parametric basis further comprises analysis of workload levels in the agents' workbins.

5. The system of claim 2, where the periodic basis further comprises a pre-determined time interval.

6. The system of claim 1, where the operation of utilizing statistical data relating to agent performance to forecast that an agent will be unlikely to process a task within a pre-defined performance criterion further includes:

utilizing statistical data relating to agent performance to determine an amount of time required to process tasks previously assigned to the agent.

7. The system of claim 1, where the operation of analyzing the content of a task object in the second buffer further includes:

utilizing workforce data to forecast at least one of availability and unavailability of an agent to process the task within a pre-determined performance criterion.

8. The system of claim 1, where the one or more servers are further configured to perform the following operations:

utilizing statistical data relating to agent performance, analyze task objects in an agent workbin to forecast that an agent will be unlikely to process a task within a pre-defined performance criterion and move the task object for the identified task from the agent's workbin to one of the input buffer and the second buffer for re-assignment.

9. The system of claim 1, where the one or more servers are further configured to perform the following operations:

utilizing statistical data relating to agent performance, analyze task objects in an agent workbin to forecast that an agent will be unlikely to process a task within a pre-defined performance criterion and move the task object for the identified task from the agent's workbin to the second buffer for re-assignment.

10. The system of claim 1, where the one or more servers are further configured to perform the following operations:

utilizing statistical data relating to agent performance, analyze task objects in a first agent workbin to forecast that a first agent will be unlikely to process a task within a pre-defined performance criterion;

apply the routing strategy to the task object in the first agent workbin to further identify a second agent for reassignment of the task object; and move the task object for the task from the first agent's workbin to the second agent's workbin.

11. The system of claim 1, where the system is further configured to operate to:

analyze task objects in an agent workbin to determine an order of priority of the task objects;

exclude task objects that cannot be presently be processed based on at least one of a predefined workflow strategy and status data; and present one of the remaining task objects to the agent based on the order of priority of the task objects.

12. The system of claim 11, where the system is further configured to operate to:

further exclude task objects from presentation to the agent that cannot be processed within a predefined performance parameter based on a routing strategy and statistical data for the agent.

13. The system of claim 11, where the system is further configured to operate to:

move the excluded task objects to one of the input buffer and the second buffer for reassignment.

14. The system of claim 11, where the system is further configured to operate to:

order the remaining task objects for presentation based on a workflow strategy.

15. The system of claim 1, where the operation of analyzing the content of a task object in the input buffer further includes:

analyzing the content of the task object in the input buffer and adding a keyword to the metadata of the task object, where the keyword is relevant to the content of the task object.

16. The system of claim 1, where the tasks further comprise interactions.

17. The system of claim 1, where the operation of analyzing the content of a task object in the input buffer further includes:

determining whether an agent has previously interacted with a source of the task object and adding metadata identifying the agent.

18. A method for managing tasks for processing by agents, the tasks being represented by task objects, the method comprising steps for:

analyzing each task object in an input buffer to identify at least one of a predefined classification or keyword relevant to the task, adding the identified relevant classification or keyword to the task object as metadata, and moving the task object to a second buffer, wherein the analyzing of each task object in the input buffer includes automatically adding a destination as part of the metadata added to each task object; and assigning each task object in the second buffer to an agent by:

using the identified relevant classification or keyword from the metadata of the task object to request workforce management data representing agent characteristics, receiving workforce management data for one or more agents having workforce management data that at least partially matches the relevant classification or keyword, applying a predefined routing strategy to the task object and the workforce management data for one or more agents to further identify one of the one or more agents for assignment of the task object, wherein the one of the one or more agents is further identified, based on utilizing statistical data relating to agent performance, as being capable of processing the task within a pre-defined performance criterion, and assigning the task object to the identified agent by moving the task object to a workbin corresponding to the identified agent.

19. A persistent computer readable medium having stored therein instructions configured to cause one or more processor devices to operate to perform a process for managing tasks for processing by agents, the tasks being represented by task objects, and the process comprising steps for:

analyzing each task object in an input buffer to identify at least one of a predefined classification or keyword relevant to the task, adding the identified relevant classification or keyword to the task object as metadata, and moving the task object to a second buffer, wherein the analyzing of each task object in the input buffer includes automatically adding a destination as part of the metadata added to each task object; and assigning each task object in the second buffer to an agent by:

using the identified relevant classification or keyword from the metadata of the task object to request workforce management data representing agent characteristics, receiving workforce management data for one or more agents having workforce management data that at least partially matches the relevant classification or keyword, applying a predefined routing strategy to the task object and the workforce management data for one or more agents to further identify one of the one or more agents for assignment of the task object, wherein the one of the one or more agents is further identified, based on utilizing statistical data relating to agent performance, as being capable of processing the task within a pre-defined performance criterion, and assigning the task object to the identified agent.

\* \* \* \* \*